(12) United States Patent
Yao

(10) Patent No.: US 11,829,832 B2
(45) Date of Patent: Nov. 28, 2023

(54) COLOR RECOGNITION METHOD AND BARCODE DETECTION DEVICE USING THE SAME

(71) Applicant: PixArt Imaging Inc., Hsin-Chu County (TW)

(72) Inventor: Wen-Han Yao, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/844,285

(22) Filed: Jun. 20, 2022

(65) Prior Publication Data

US 2023/0325617 A1 Oct. 12, 2023

Related U.S. Application Data

(63) Continuation of application No. 17/191,973, filed on Mar. 4, 2021, now Pat. No. 11,409,976.

(51) Int. Cl.
*G06T 7/90* (2017.01)
*G06K 7/10* (2006.01)
*G06K 7/14* (2006.01)

(52) U.S. Cl.
CPC ....... *G06K 7/10722* (2013.01); *G06K 7/1413* (2013.01); *G06T 7/90* (2017.01); *G06T 2207/10024* (2013.01)

(58) Field of Classification Search
CPC .............................. G06K 7/10722; G06T 7/90
USPC ....................................................... 235/462.41
See application file for complete search history.

(56) References Cited

U.S. PATENT DOCUMENTS

2008/0298688 A1* 12/2008 Cheong .................. G06V 10/56
382/162

* cited by examiner

*Primary Examiner* — Toan C Ly
(74) *Attorney, Agent, or Firm* — WPAT, P.C.

(57) ABSTRACT

There is provided a barcode detection device including an image sensor and a processor. The image sensor captures an image frame of a color barcode. The processor sequentially processes every row of the image frame to find at least one color segment in each row of the image frame, categorizes color segments of a same color in one cluster according to a position relationship and a color similarity of the color segments in the image frame, and recognize a color of the pixels in one cluster according to color parameters of pixels in said one cluster.

18 Claims, 9 Drawing Sheets

COLOR RECOGNITION METHOD AND BARCODE DETECTION DEVICE USING THE SAME

CROSS REFERENCE TO RELATED APPLICATION

This application is a continuation application of U.S. patent application Ser. No. 17/191,973 filed on Mar. 4, 2021, the full disclosure of which is incorporated herein by reference.

BACKGROUND

1. Field of the Disclosure

This disclosure generally relates to a color barcode detection and, more particularly, to a color recognition method for color barcodes and a barcode detection device using the same.

2. Description of the Related Art

In the color barcode detection, a barcode sensor needs to recognize colors of different bars of a color barcode, and then identifies a color pattern of the recognized bar colors so as to know the meaning of the color barcode. Accordingly, it is required to accurately recognize the color of every bar of the barcode before identifying the color pattern of the bar colors.

Conventionally, several predetermined ranges associated with bar colors of the color barcode are previously defined in a color plane through measuring the bar colors. In recognizing colors of different bars, the barcode sensor converts (R,G,B) values of every pixel of a captured image frame into the color plane, and recognizes a color of one pixel according to a range among the several predetermined ranges in which the converted (R,G,B) value of the one pixel is located. However, in mass production, different barcodes can have color deviation from one another such that it is difficult to accurately categorize the color of every pixel in the image frame by using fixed predetermined ranges.

For example, FIG. 1 shows a schematic diagram of the color categorization of a conventional barcode sensor. If the predetermined ranges in the color plane are defined in the way that a region above 0-point of Y-axis is color 1 and a region below 0-point of Y-axis is color 2. It is seen from FIG. 1 that some pixels (shown as crosses) that are supposed to be color 1 appear below 0-point of Y-axis and some pixels (shown as dots) that are supposed to be color 2 appear above 0-point of Y-axis. Therefore, it is difficult to accurately categorize all pixels in one image frame using this way.

Accordingly, the present disclosure further provides a color recognition method for color barcode detection to accurately categorize the color of every pixel in a captured image frame, and a barcode detection device using the same.

SUMMARY

The present disclosure provides an optical barcode detection device and a color recognition method that firstly calculate an average color of every bar and then determine a color of every bar by identifying which of several predetermined color regions in a color plane that the average color of every bar locates in.

The present disclosure further provides an optical barcode detection device and a color recognition method that recognize bar colors using clustered pixels instead of recognizing bar colors in the pixel-by-pixel manner.

The present disclosure provides a barcode detection device including an image sensor, a processor, a first register and a frame buffer. The image sensor is configured to capture an image frame of a barcode having separately arranged color bars. The processor is coupled to the image sensor, and configured to find color segments corresponding to the color bars in each row of the image frame, categorize each of the color segments into one of multiple clusters according to a position relationship and a color similarity between the color segments and the multiple clusters, and recognize a color of each cluster among the multiple clusters according to second parameters of the each cluster after all color segments in the image frame are categorized. The first register is configured to temporarily store first parameters of one color segment. The frame buffer is configured to store a cluster ID associated with one of the multiple clusters into which the one color segment is categorized.

The present disclosure further provides a color recognition method of a barcode detection device including a first register and multiple second registers. The color recognition method includes the steps of: storing first parameters of one color segment of an image frame into the first register; comparing a position relationship between the first parameters in the first register with second parameters of each of multiple clusters, respectively stored in the multiple second registers; merging the first parameters in the first register into the second register which stores one of the multiple clusters whose second parameters are position related with the first parameters in the first register; recognizing a color of each cluster among the multiple clusters according to the second parameters of the each cluster after all color segments in the image frame are merged into respective clusters; when a segment length of the one color segment is larger than a threshold, creating a new cluster to be stored in one of the multiple second registers when all the multiple second registers are empty; and when the segment length of the one color segment is smaller than the threshold, abandoning the one color segment.

The present disclosure further provides a barcode detection device including an image sensor, a processor, a first register and a frame buffer. The image sensor is configured to capture an image frame of a barcode having separately arranged color bars. The processor is coupled to the image sensor, and configured to find multiple color segments corresponding to the color bars in the image frame, categorize the multiple color segments respectively into multiple clusters according to a position relationship and a color similarity between the color segments, and recognize a color of each cluster according to second parameters of each of the multiple clusters. The first register is configured to temporarily store first parameters of the multiple color segments. The frame buffer is configured to record cluster IDs of the color segments.

The present disclosure further provides a color recognition method of a barcode detection device including a first register and multiple second registers. The color recognition method includes the steps of: storing first parameters of one color segment of an image frame into the first register; comparing a position relationship between the first parameters in the first register with second parameters of each of multiple clusters, respectively stored in the multiple second registers; merging the first parameters in the first register into the second register which stores one of the multiple clusters whose second parameters are position related with the first parameters in the first register; recognizing a color of each cluster among the multiple clusters according to the second parameters of the each cluster after all color segments in the image frame are merged into respective clusters; and merging two clusters when the position relationship of the first parameters of the one color segment is related with the two clusters.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The barcode detection device of the present disclosure is adapted to identify the color of every bar of a barcode in a sequence of categorizing pixels of an image frame belonging to different color IDs into different clusters, calculating an average of cluster parameters in the same cluster, and confirming a color of every cluster according to a position of the averaged cluster parameters in a color plane. More specifically, pixels that are position related (e.g., shown in FIG. 7) are grouped as one cluster at first, and then the color of every group of the image frame is given after all groups of the image frame are determined.

Figure 2:
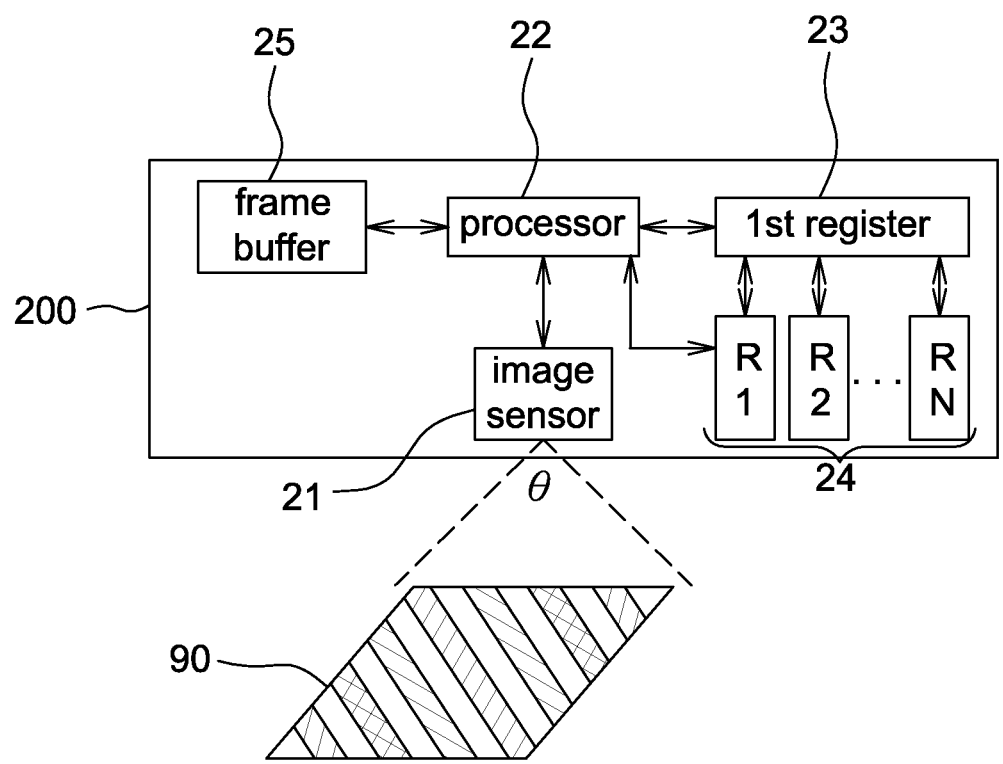
FIG. 2 is a schematic block diagram of a barcode detection device according to one embodiment of the present disclosure.

Please referring to FIG. 2, it is a schematic block diagram of a barcode detection device 200 according to one embodiment of the present disclosure. The barcode detection device 200 includes an image sensor 21, a processor 22, a first register 23, multiple second registers 24 (e.g., shown as R1 to RN in FIG. 2) and a frame buffer 25. In another aspect, at least one of the first register 23, the multiple second registers 24 and the frame buffer 25 are embedded in the processor 22.

The image sensor 21 is a CMOS image sensor, a CCD image sensor or the like, and used to capture an image frame (e.g., IFr shown in FIG. 3) of a barcode 90 which has separately arranged color bars, e.g., shown by regions filled with different line patterns in FIG. 2. Preferably, a field of view θ of the image sensor 21 covers one barcode or most of one barcode in order to recognize the specific meaning (determined according to different applications) of the barcode indicated by different combinations or patterns of bar colors. A number of colors in the barcode 90 is not particularly limited.

Figure 3:
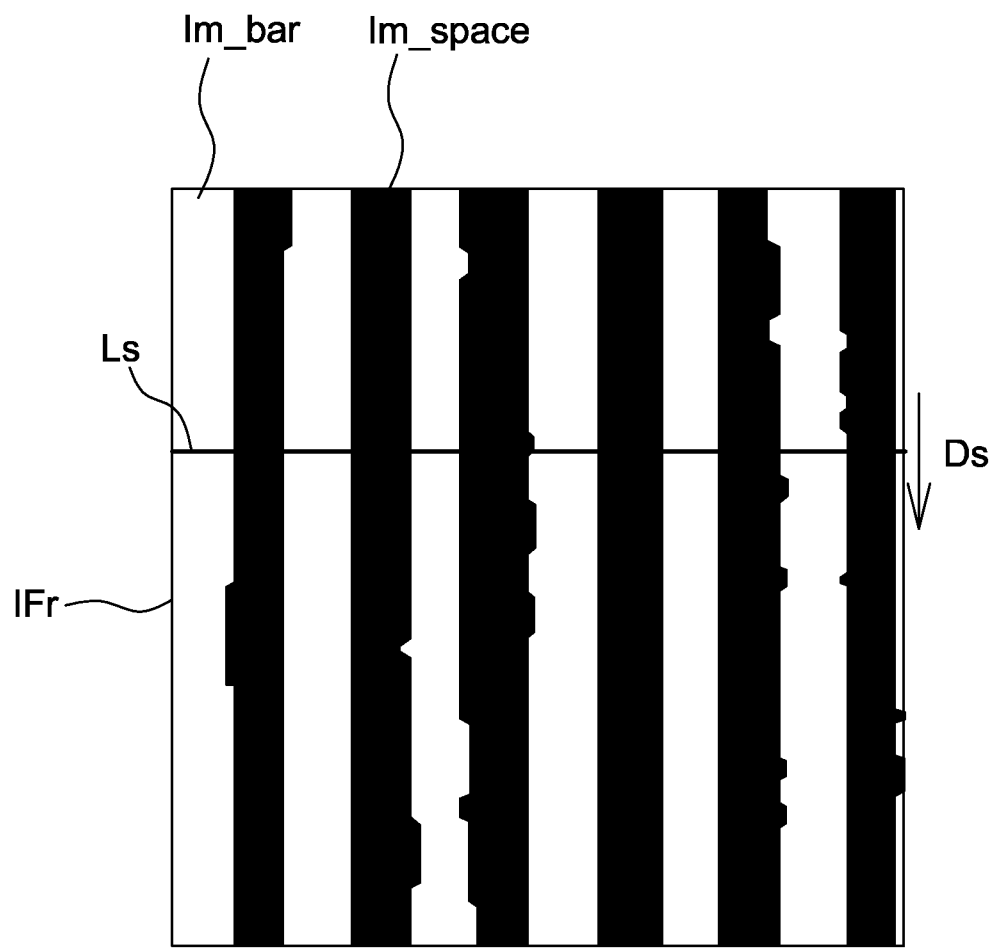
FIG. 3 is a schematic diagram of an image frame captured by an image sensor of a barcode detection device according to one embodiment of the present disclosure.

For illustration purposes, two adjacent bars of the barcode 90 are shown to be separated by a space (e.g., shown by blank regions in FIG. 2) therebetween, but not limited thereto. Accordingly, the image frame IFr has multiple bar images Im_bar, e.g., shown as white regions in FIG. 3, and multiple space images Im_space, e.g., shown as black regions in FIG. 3. It is appreciated that distributions of the bar images Im_bar and the space images Im_space in the image frame IFr are determined according to how the field of view θ covers one barcode 90. That is, although FIG. 3 shows that the bar images Im_bar and the space images Im_space are extending in the up-down direction, it is only intended to illustrate but not to limit the present disclosure.

The processor 22 is a microcontroller unit (MCU) or an application specific integrated circuit (ASIC). The processor 22 implements functions (e.g., shown in FIGS. 9-10) thereof using the hardware and/or firmware codes. The processor 22 is coupled to the image sensor 21 to receive the image frame IFr therefrom. Each pixel of the image frame IFr includes a red color (R) gray level, a green color (G) gray level and a blue color (B) gray level for color mixing, or includes a red color (R) gray level, two green color (G) gray levels and a blue color (B) gray level for color mixing, or includes other combinations of different color gray levels for color mixing without particular limitations. For illustration purposes, the image sensor 21 of the present disclosure is a color image sensor to acquire (R, G, B) gray levels of each pixel. The operation of a color image sensor is known to the art, and thus details thereof are not described herein.

The processor 22 then scans the image frame IFr to find multiple color segments, each having the same color, corresponding to color bars of the barcode 90 in each row of the image frame IFr. It should be mentioned that although FIG. 3 shows that a scan direction Ds is along a length direction of the bar images Im_bar to accomplish the scan of the whole image frame IFr, the present disclosure is not limited thereto. The processor 22 actually performs the scan of the image frame IFr from the upper left pixel to the lower right pixel in a pixel-by-pixel manner, and the scan direction with respect to the bar images Im_bar is determined according to the view angle θ of the image sensor 21. In the case that the pixel row of the image frame IFr is not parallel to the length direction of the bar images Im_bar, said multiple color segments are found after scanning one pixel row of the image frame IFr.

Figure 4:
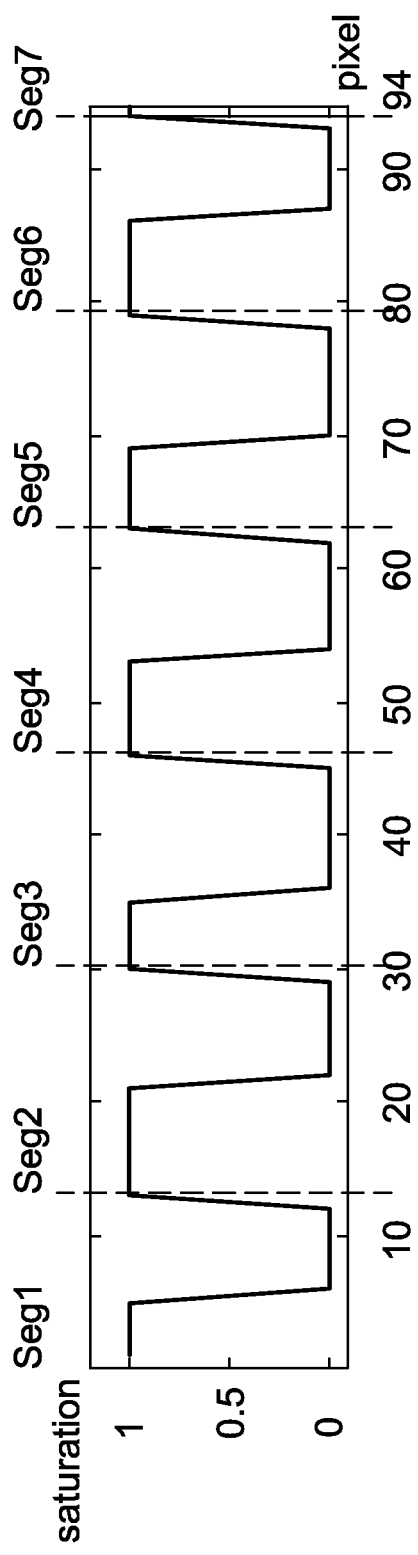
FIG. 4 is a schematic diagram of segments in one pixel row of an image frame captured by a barcode detection device according to one embodiment of the present disclosure.

In the present disclosure, one color segment is a pixel section in one pixel row. For example, FIG. 4 shows the saturation of one pixel row versus the pixel location, e.g., corresponding to a pixel row Ls in FIG. 3, of the image frame IFr. The saturation of each pixel is calculated using, for example, (R, G, B) gray levels thereof using any suitable method.

Next, the processor 22 respectively compares a saturation of successive pixels in a same row of the image frame IFr with a saturation threshold to determine a color segment in the same row of the image frame IFr. For example, if the saturation of successive pixels is larger than 0, 0.25 or 0.5, the successive pixels form a color segment, e.g., FIG. 4 showing seven color segments Seg1 to Seg7. The segment lengths of the multiple color segments Seg1 to Seg7 are determined according to color bars of the barcode 90. The sections having the saturation equal to or smaller than the saturation threshold=0, 0.25 or 0.5 in FIG. 4 are corresponding to spaces of the barcode 90. After the processor 22 finds the multiple color segments Seg1 to Seg7 of one pixel row, the processor 22 then categorizes the multiple color segments respectively into multiple clusters, e.g., ID1 o IDN in FIG. 8, according to a position relationship and a color similarity between the color segments.

After one pixel row is processed or categorized, the processor 23 moves to a next pixel row of the image frame IFr and so on and processes the followed pixel rows in the same way as illustrated in the previous paragraph till the whole image frame IFr is processed. Finally, the processor 22 respectively averages second parameters (or called cluster parameters) of each of the multiple clusters to accordingly recognize a color of each cluster.

Figure 8:
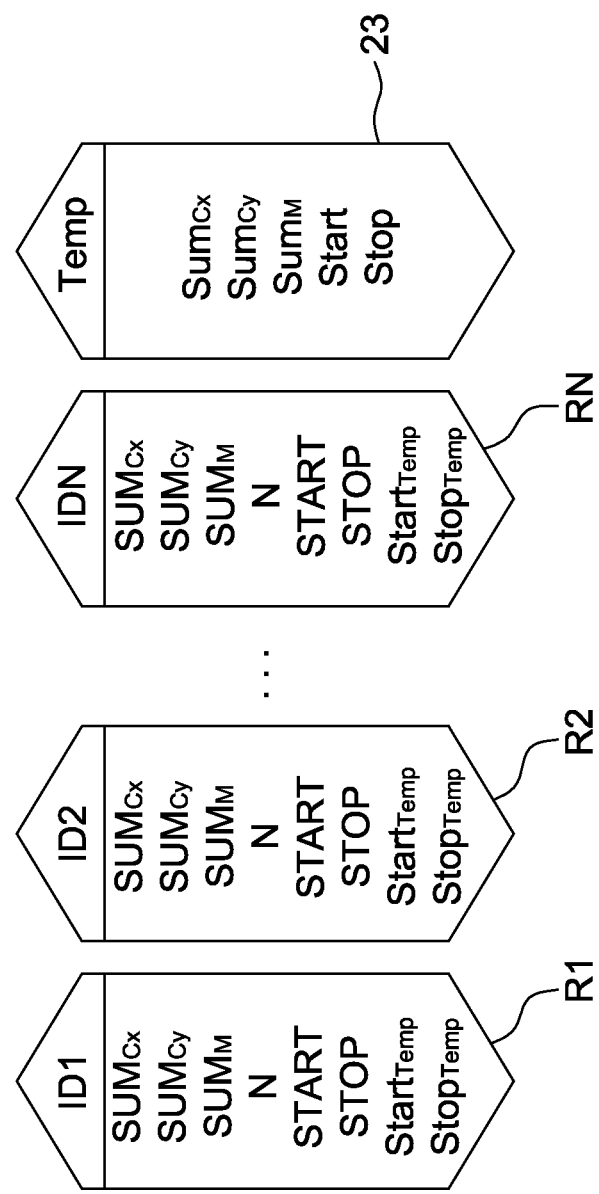
FIG. 8 is a schematic diagram of parameters stored in the register group of a barcode detection device according to one embodiment of the present disclosure.

In the present disclosure, the multiple second registers 24 respectively store second parameters of the multiple clusters, each having an ID for distinguishing therebetween shown as ID1 to IDN in FIG. 8. For example, if the color segments Seg1 to Seg7 are identified, the register R1 stores cluster parameters of Seg1, the register R2 stores cluster parameters of Seg2, . . . , the register RN (e.g., R6 herein) stores cluster parameters of Seg 6. For illustration purposes, as a segment length of the color segment Seg7 is too short, pixel data (i.e. color data) of Seg7 is abandoned, i.e. Seg7 not considered as a bar color.

Figure 5:
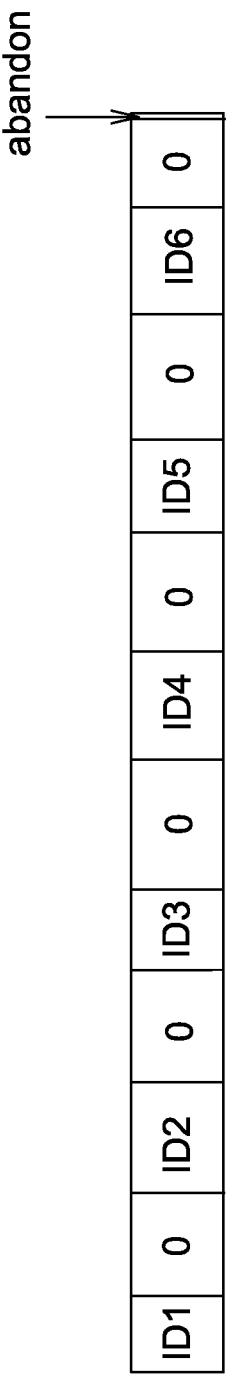
FIG. 5 is a schematic diagram of barcode segment IDs identified corresponding to FIG. 4.

Referring to FIGS. 4 and 5, in processing one pixel row of the image frame IFr, the processor 22 categorizes each of the color segments Seg1 to Seg6 into one of multiple clusters (e.g., respectively recorded in the registers R1 to RN) according to a position relationship and a color similarity between the color segments Seg1 to Seg6 and the multiple clusters ID1 to IDN.

Referring to FIG. 8 at the same time, in processing the color segment Seg1, the first register 23 temporarily stores first parameters of the color segment Seg1. For example, the processor 22 calculates $C_X=255\times(R-G)/\max(R, G, B)$ of each pixel in the color segment Seg1 as an X-position of each pixel in a $C_X$-$C_Y$ color plane, and calculates $C_Y=255\times(G-B)/\max(R, G, B)$ of each pixel in the color segment Seg1 as an Y-position of each pixel in the $C_X$-$C_Y$ color plane, wherein $C_X$ and $C_Y$ are respectively used as an axis of a color plane of the present disclosure, and max(R, G, B) is a maximum value among a red color gray level (R), a green color gray level (G) and a blue color gray level (B) of each pixel. It should be mentioned that other color planes may be defined according to (R, G, B) values of pixel gray levels.

In one aspect, the first parameters include $Sum_{cx}$, $Sum_{cy}$, $Sum_M$, Start and Stop as shown in FIG. 8. The "$Sum_{cx}$" is a summation of X-positions of multiple pixels in the color segment Seg1 in the $C_X$-$C_Y$ color plane. The "$Sum_{cy}$" is a summation of Y-positions of the multiple pixels in the color segment Seg1 in the $C_X$-$C_Y$ color plane. The "$Sum_M$" is a summation of max(R, G, B) of each of the multiple pixels in the color segment Seg1. The "Start" is a position (or pixel number) of a start pixel of the color segment Seg1. The "Stop" is a position (or pixel number) of a stop pixel of the color segment Seg1. FIG. 8 shows "Temp" to indicate the first register 23 because the first parameters of the color segment Seg1 are temporarily stored in the first register 23 in processing the color segment Seg1.

After all pixel data (i.e. the first parameters) of the color segment Seg1 is stored in the first register 23, the processor 22 compares the stored first parameters in the first register 23 respectively with the second parameters, including $SUM_{cx}$, $SUM_{cy}$, $SUM_M$, N, START, STOP in R1 to RN. If the color segment Seg1 is position-related or color-related with one cluster, the color segment Seg1 is categorized into the related cluster, e.g., ID1 stored in the second register R1. Said "categorized" herein is referred to the second parameters of the cluster ID1 are updated according to the first parameters of the color segment Seg1 categorized into the cluster ID1. For example, the first parameter $Sum_{cx}$ in the first register 23 is added to the second parameter $SUM_{cx}$ in the cluster ID1, the first parameter $Sum_{cy}$ in the first register 23 is added to the second parameter $SUM_{cy}$ in the cluster ID1, the first parameter $Sum_M$ in the first register 23 is added to the second parameter $SUM_M$ in the cluster ID1, the first parameter "Start" of Seg1 in the first register 23 is added to the second parameter $Start_{Temp}$ in the cluster ID1, and the first parameter "Stop" of Seg1 in the first register 23 is added to the second parameter $Stop_{Temp}$ in the cluster ID1. The second parameter N is added by (STOP−START+1) in the first register 23, which represents a number of pixels included in the color segments categorized into the cluster ID1.

After the cluster ID1 is updated by the first parameters in the first register 23, the first register 23 is cleared and then the processor 22 processes the color segment Seg2 using the same procedure as processing the color segment Seg1 and so on till the color segment Seg7 in the same pixel row is processed. FIG. 5 shows that the color segment Seg1 is categorized into the cluster ID1, the color segment Seg2 is categorized into the cluster ID2, . . . , and the color segment Seg6 is categorized into the cluster ID6. In the present disclosure, the color segment Seg7 is not considered as a color bar image and thus it is not categorized into any cluster. Till now, the pixel data of each of color segments Seg1 to Seg6 are sequentially stored in the first register 23 at first to be compared with the second parameters in the clusters ID1 to ID6, and then respectively added to the related cluster.

Figure 6:
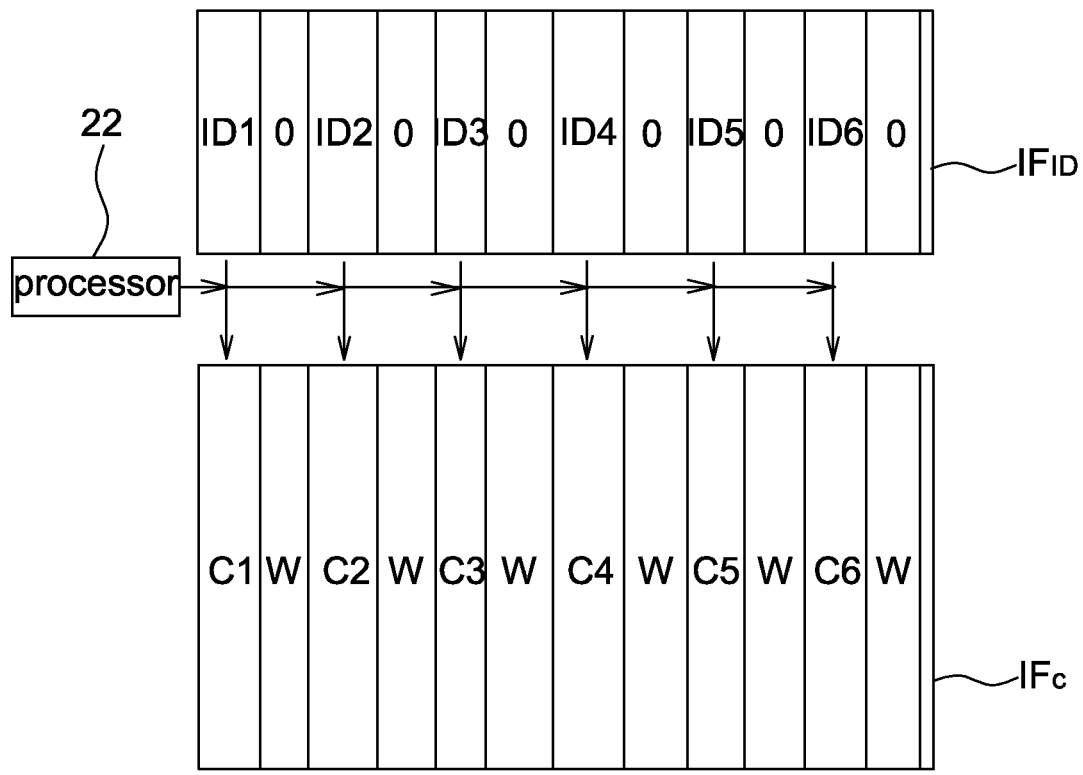
FIG. 6 is a schematic diagram of segment IDs and bar colors recognized by a barcode detection device according to one embodiment of the present disclosure.

After the processor 22 processes all pixel rows of the image frame IFr using the same way as FIGS. 4-5, the frame buffer 25 stores a cluster ID associated with each of the multiple clusters (e.g., ID1-ID6) at corresponding color segments in a frame, shown as $IF_{ID}$ in FIG. 6. In FIG. 6, each cluster ID is respectively indicated by a digital value, and the space image Im_space is indicated by 0, but not limited to, as long as distinguishable from the cluster ID. More specifically, in $IF_{ID}$, if some pixels whose pixel data are categorized into the cluster ID1, those pixels are indicated by ID1; if some pixels whose pixel data are categorized into the cluster ID2, those pixels are indicated by ID2; . . . ; if some pixels whose pixel data are categorized into the cluster ID6, those pixels are indicated by ID6; and if some pixels whose pixel data are not categorized into any cluster, those pixels are indicated by 0. Finally, the processor 22 uses the second parameters in each of the clusters ID1 to ID6 to respectively determine the color of each of the clusters ID1 to ID6.

Figure 7:
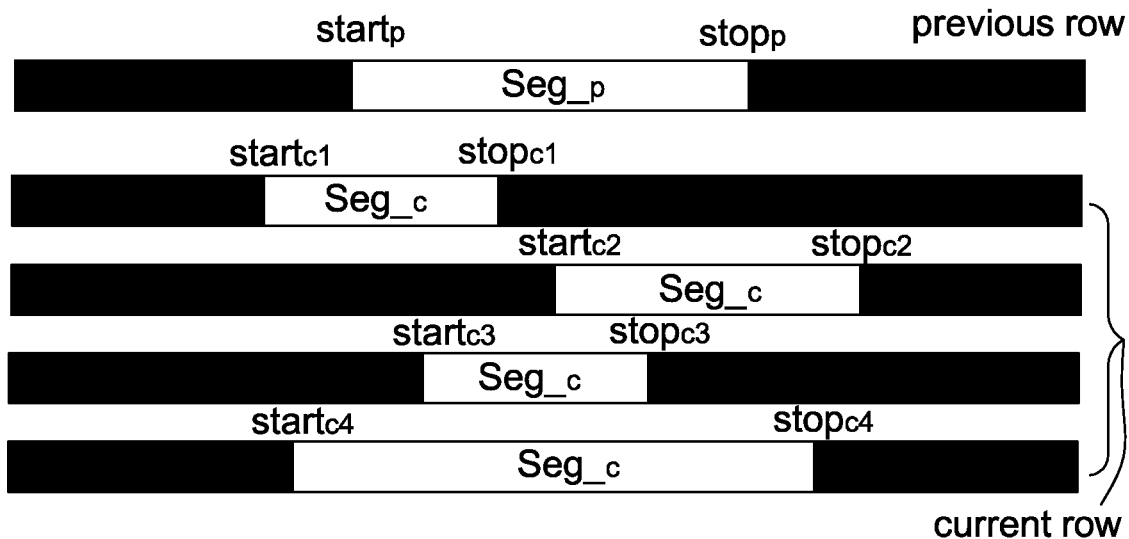
FIG. 7 is a schematic diagram of related two segments in adjacent pixel rows in an image frame captured by an image sensor of a barcode detection device according to one embodiment of the present disclosure.

Referring to FIG. 7, it is a schematic diagram of determining the position relationship between two adjacent rows, shown as a previous row and a current row, of the image frame IFr. It should be mentioned that although FIG. 7 shows four current rows, it is intended to show four possible positional relationships between a current color segment with respect to a previous color segment. The processor 22 determines the position relationship according to a current start pixel (e.g., shown as $start_{c1}$ to $start_{c4}$) and a current stop pixel (e.g., shown as $stop_{c1}$ to $stop_{c4}$) of a color segment Seg_c in a current pixel row of the image frame IFr as well as a previous start pixel (e.g., shown as $start_p$) and a previous stop pixel (e.g., shown as $stop_p$) of a color segment Seg_p in a previous pixel row of the image frame IFr. If a color segment Seg_c belongs to one of the four position relationship shown in FIG. 7, i.e. an end of Seg_c being larger than or equal to a start of Seg_p and a start of Seg_c being smaller than or equal to an end of Seg_p, the color segment Seg_c is position-related with the color segment Seg_p, and the color segment Seg_c is categorized into a cluster to which the color segment Seg_p belongs. In the present disclosure, $start_p$ and $stop_p$ (e.g., pixel location in one pixel row) of every color segment of the previous pixel row is stored in the second parameters "START" and "STOP" of the clusters ID1 to IDN. If one pixel row of the image frame IFr contains multiple color segments, the second parameters "START" and "STOP" respectively record multiple sets of $start_p$ and $stop_p$ each set corresponding to one color segment Seg_p.

Referring to FIG. 8 again, the processor 22 further determines the color similarity according to a color difference between a summation of the first parameters of one color segment stored in the first register 23 and a summation of the second parameters of each of the multiple clusters ID1 to IDN respectively stored in the second registers R1 to RN. Taking the color segment Seg1 as an example, if a summation of a square of difference ($Sum_{cx}$–$SUM_{cx}$ in ID1) and a square of difference ($Sum_{cy}$–$SUM_{cy}$ in ID1) is smaller than a threshold, it means that the color segment Seg1 is color-related with the cluster ID1 such that the color segment Seg1 is categorized into the cluster ID1; otherwise, the processor 22 calculates of a summation of a square of difference ($Sum_{cx}$–$SUM_{cx}$ in ID2) and a square of difference ($Sum_{cy}$–$SUM_{cy}$ in ID2), . . . , a square of difference ($Sum_{cx}$–$SUM_{cx}$ in IDN) and a square of difference ($Sum_{cy}$–$SUM_{cy}$ in IDN) to determine which of the clusters ID2 to IDN is color-related to the color segment Seg1, i.e. a summation of the square differences being smaller than the threshold.

Figure 9:
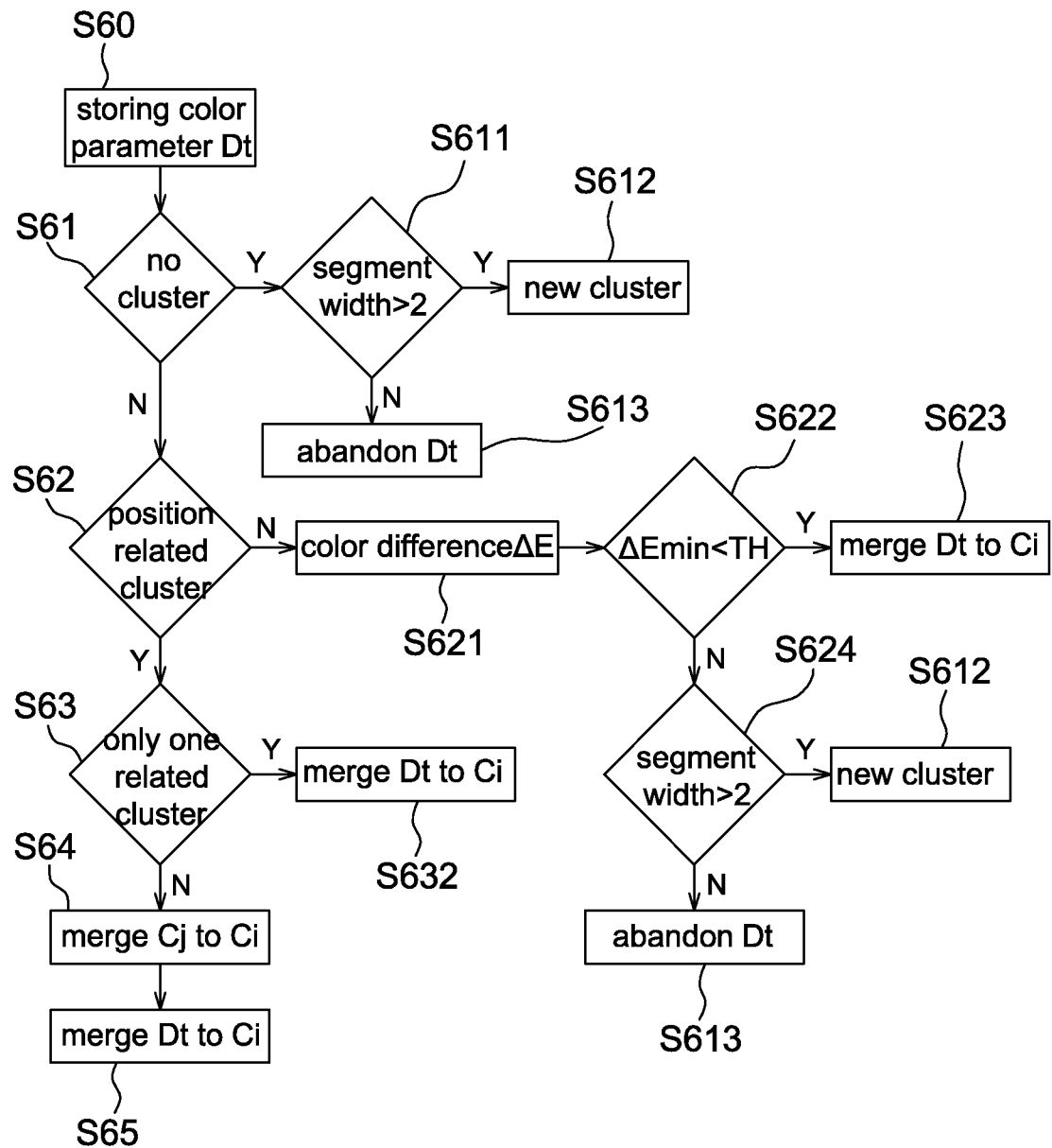
FIG. 9 is a flow chart of a color recognition method of a barcode detection device according to one embodiment of the present disclosure.

It should be mentioned that the color relationship is not limited to be determined using the method mentioned in the previous paragraph. In another aspect, the processor 22 calculates an inner product of a color vector ($Sum_{cx}$, $Sum_{cy}$) in the register 23 of a current color segment with a color vector ($SUM_{cx}$, $SUM_{cy}$) of each of the clusters ID1 to IDN, and then selects a maximum inner product to be compared with a predetermined threshold. If the maximum inner product is larger than the predetermined threshold, then the current color segment in the register 23 is color-related with the cluster associated with the maximum inner product. However, if the maximum inner product is smaller than the predetermined threshold, the current color segment is not related to any of current clusters and a new cluster is added as illustrated in FIG. 9. In another aspect, the processor 22 calculates an angle $\theta_{temp}$ of a color vector ($Sum_{cx}$, $Sum_{cy}$) in the register 23 of a current color segment in the $C_X$-$C_Y$ plane and calculates an angle $\theta_{cluster}$ of a color vector ($SUM_{cx}$, $SUM_{cy}$) in each of ID1 to IDN. If a difference between $\theta_{temp}$ and $\theta_{cluster}$ among one of the clusters ID1 to IDN is smaller than an angle threshold, the current color segment is associated with the one of the clusters ID1 to IDN. Otherwise, the current color segment is not related to any of current clusters and a new cluster is added as illustrated in FIG. 9.

Then, the processor 22 respectively averages second parameters (e.g., calculating $SUM_{cx}/N$, $SUM_{cy}/N$ and $SUM_M/N$) of each of the multiple clusters ID1 to IDN after all color segments in the image frame IFr are categorized.

Meanwhile, the processor 22 stores cluster IDs corresponding to different bar images Im_bar in the frame buffer 25, e.g., shown as $IF_{ID}$ in FIG. 6. Finally, the processor 22 recognizes a color of each cluster among the multiple clusters ID1 to IDN according to a position ($SUMm_{cx}/N$, $SUMm_{cy}/N$) of the averaged second parameters of the each cluster in the $C_X$-$C_Y$ color plane to form a frame containing color bars, shown as IFc in FIG. 6, wherein C1 to C6 indicates different colors corresponding to bar colors of the barcode 90, and W indicates white color corresponding to spaces of the barcode 90. The processor 22 then uses the frame IFc to perform the barcode recognition.

In another aspect, $Sum_{cx}$=a summation of 255×(R−G) of all pixels in one current color segment; $Sum_{yx}$=a summation of 255×(G−B) of all pixels in the one current color segment; $Sum_M$=a summation of max(R, G, B) of all pixels in the one current color segment; $SUM_{cx}$=a summation of 255×(R−G) of all pixels of all color segments in the image frame IFr; $SUM_{yx}$=a summation of 255×(G−B) of all pixels of all color segments in the image frame IFr; and $SUM_M$=a summation of max(R, G, B) of all pixels of all color segments in the image frame IFr. A position of a cluster is ($SUMm_{cx}/SUM_M$, $SUMm_{cy}/SUM_M$). It is appreciated that if the color plane is defined by other axes, the position of a cluster is in the color plane is calculated using different equations.

Figure 11:
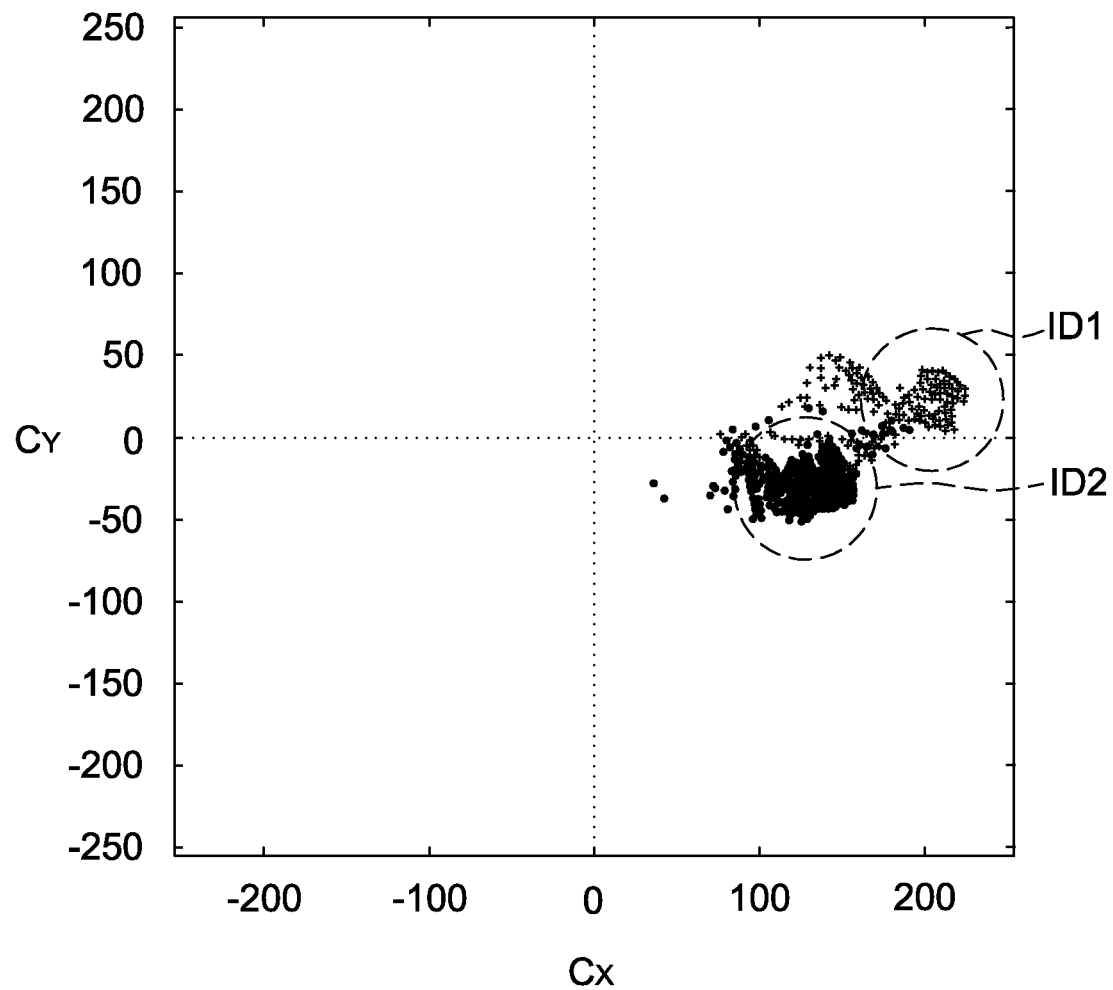
FIG. 11 is a schematic diagram of pixel colors in a color plane categorized by a barcode detection device according to one embodiment of the present disclosure.

Referring to FIG. 11, if it is set that a position ($SUM_{cx}/N$, $SUM_{cy}/N$) of the averaged second parameters of one cluster (e.g., ID1) in the $C_X$-$C_Y$ color plane above $C_Y$=0 is color A, then the whole pixels categorized into the cluster ID1 is color A; and if it is set that a position ($SUM_{cx}/N$, $SUM_{cy}/N$) of the averaged second parameters of one cluster (e.g., ID2) in the $C_X$-$C_Y$ color plane below $C_Y$=0 is color B, then the whole pixels categorized into the cluster ID2 is color B. It is seen that some pixels located below $C_Y$=0 are categorized as color A since they belong to the cluster A, and some pixels located above $C_Y$=0 are categorized as color B since they belong to the cluster B. The circles ID1 and ID2 shown in FIG. 11 indicate ranges of ID1 and ID2 are not categorized by $C_Y$=0.

Figure 10:
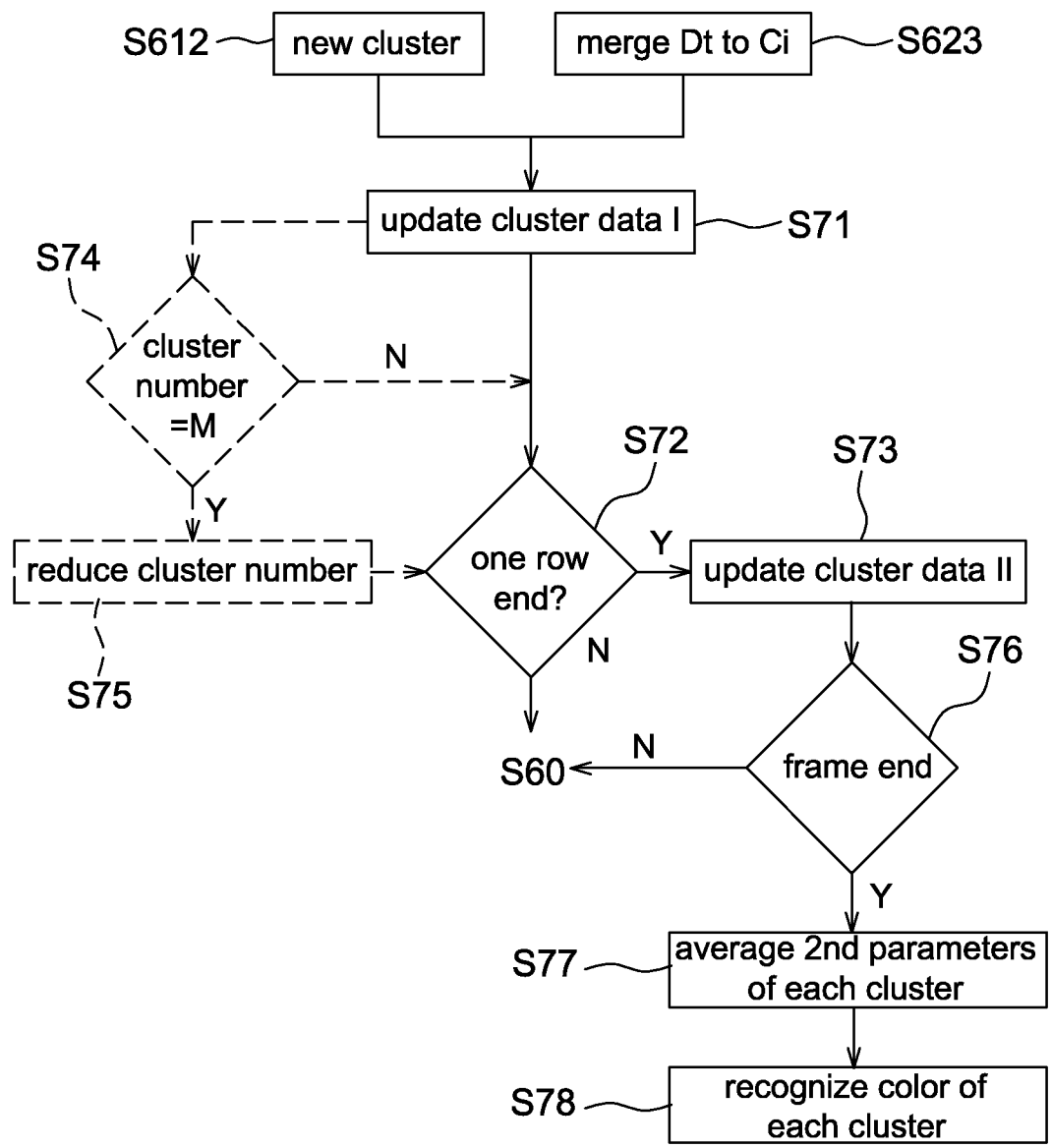
FIG. 10 is a continuous flow chart of a color recognition method in FIG. 9.

Referring to FIG. 9, it is a schematic diagram of a color recognition method of a barcode detection device according to one embodiment of the present disclosure. The color recognition method in FIGS. 9-10 is adapted to the barcode detection device 200 in FIG. 2.

Step S60: The image sensor 21 captures an image frame (e.g., IFr shown in FIG. 3) and transmits the image frame IFr to the processor 22. The processor 22 scans or processes the image frame IFr in a row-by-row manner. The processor 22 finds multiple color segments in each pixel row, e.g., Seg1 to Seg7 shown in FIG. 4, for example by comparing a saturation of successive pixels in a same row of the image frame IFr with a saturation threshold to determine each color segment in the same row of the image frame IFr, but the present disclosure is not limited thereto. In processing the color segment Seg1, the processor 22 stores first parameters Dt (e.g., $Sum_{cx}$, $Sum_{cy}$, $Sum_M$, Start and Stop shown in FIG. 8) of one color segment, e.g., Seg1, of the image frame IFr into the first register 23.

Step S61 to S 613: If the color segments Seg1 to Seg7 are in the first pixel row of the image frame IFr, all second registers R1 to RN are empty and the processor 22 identifies that no cluster has been created, and the process moves to the Step S611. The processor 22 compares a segment length of a current color segment (i.e. first parameters thereof being temporarily stored in the first register 23, and the segment length=Stop−Start+1) with a predetermined threshold, e.g., FIG. 9 showing 2-pixels length, but not limited to. If the segment length of a color segment, e.g., Seg7 in FIG. 4, is smaller than the predetermined threshold, the processor 22 abandons the color segment (Step S613), i.e. not considering Seg7 as a valid color segment, caused by noises. If the segment length of a color segment, e.g., Seg1 in FIG. 4, is larger than the predetermined threshold, the processor 22 creates a new cluster (e.g., ID1) to be stored in one of multiple second registers, e.g., R1, Step S612, and the first parameters Dt in the first register 23 is moved into the cluster ID1.

Step S62-S624: When identifying that there is at least one cluster has been created in Step S61, the processor 22 compares a position relationship between the first parameters Dt in the first register 23 with second parameters of each of the at least one cluster, e.g., ID1 to IDN, respectively stored in the multiple second registers R1 to RN. When the first parameters Dt in the first register 23 are not position-related (e.g., referring to FIG. 7) with any cluster, more specifically by comparing the first parameters "Start" and "Stop" in the Temp with the second parameters "START" and "STOP" in every cluster ID1 to IDN, the processor 22 further calculates a color similarity between the first parameters Dt in the first register 23 with the second parameters of each cluster ID1 to IDN to determine a color-related cluster among the existed cluster(s). If one of the multiple clusters ID1 to IDN is color-related (as mentioned above) with the first parameters Dt in the first register 23 (Step S621-S622), the processor 22 merges the first parameters Dt into the color-related cluster Ci (i.e. one of ID1 to IDN) in the Step S623. However, if there is no cluster color-related with the first parameters Dt in the first register 23, the process moves to the Step S624 and the processor 22 compares a segment length of the color segment whose first parameters Dt are currently stored in the first register 23. Similar to the Step S611 mentioned above, when the segment length is smaller than a predetermined threshold, the color segment is ignored and the first parameters Dt thereof are abandoned. On the contrary, when the segment length is larger than the predetermined threshold, the processor 22 creates a new cluster to be stored in an empty second register 24. More specifically, if a color segment whose first parameters Dt is not position-related and color-related with any existed cluster(s), the color segment is considered as a new color and a new cluster is created.

Meanwhile, in the present disclosure, the processor 22 compares a segment length of each of color segments (with no position-related or color-related cluster existed) with a threshold to determine whether to create a new cluster (Step S612) before all color segments in the image frame IFr are categorized.

Step S63-S632: If there is only one cluster position-related and/or color-related with the current color segment, the processor 22 merges the first parameters in the first register 23 into the second register which stores one of the multiple clusters ID1 to IDN whose second parameters are position-related with the first parameters in the first register 23. That is, the content in $Sum_{cx}$, $Sum_{cy}$, $Sum_M$, Start and Stop are added to the $SUM_{cx}$, $SUM_{cy}$, $SUM_M$, $Start_{Temp}$ and $Stop_{Temp}$ in the related cluster. It should be mentioned that "Start" and "Stop" are not used to replace the content in the $Start_{Temp}$ and $Stop_{Temp}$ but to add as new elements in content array of the $Start_{Temp}$ and $Stop_{Temp}$.

Step S64: In some scenarios, one color segment in the image frame IFr is mistakenly identifies as two separated color segments due to noises or contamination on the barcode 90. Accordingly, the processor 22 further merges two clusters when the position relationship of one color segment is position-related with the two clusters. Normally, one color segment in a current pixel row is position-related, e.g., determined according to FIG. 7, with only one cluster that is determined according to previous pixel row(s). If the one color segment in a current pixel row is position-related with two clusters that are identifies as two different clusters in the previous pixel row(s), these two clusters are merged as one cluster, i.e. second parameters of these two clusters are merged into one register among the two registers originally storing the second parameters of these two clusters.

Step S65: Then, the processor 22 merges the first parameters Dt in the first register 23 into the second register which stores the merged cluster in Step S64.

Referring to FIG. 10, it is a flow chart of a color recognition method of a barcode detection device 200 when a new cluster is created (Step S612) or the first parameters Dt is added/merged to the related cluster (Step S623).

Step S71: In merging the first parameters Dt to the related cluster, the first parameters "Start" and "Stop" are added to the second parameters "$Start_{Temp}$" and "$Stop_{Temp}$" of the related cluster after one color segment is processed. If this one color segment is not the last color segment of one pixel row, the process returns to the Step S60 and runs the flow chart from FIG. 9 to FIG. 10 again. However, if this one color segment is the last color segment of one pixel row, the processor 22 updates the second parameters "START" and "STOP" in the related cluster by the second parameters "$Start_{Temp}$" and "$Stop_{Temp}$" of the same cluster such that the second parameters "START" and "STOP" record at least one set of start pixel and end pixel of the processed pixel row. The second parameter "N" is updated by adding a difference="Stop"−"Start"+1 in the Temp to indicate a total number of pixels belong to this cluster.

Furthermore, in merging the first parameters Dt in the first register 23 of one color segment into the second register 24 having a cluster ID, the processor 22 stores the cluster ID associated with the one color segment in the frame buffer 25 shown as $IF_{ID}$ in FIG. 6.

In some aspects, the barcode detection device 200 of the present disclosure further performs the Steps S74-S75. In one aspect, the second registers 24 have a number larger than a number of bar colors by 1. Accordingly, when a number of multiple clusters reaches a number M of second registers 24 before all color segments in the image frame IFr are categorized (Step S74), that means a wrong cluster is categorized, and the processor 22 reduces a number of multiple clusters (Step S75). In one aspect, the processor 22 merges two clusters having closest color relationship, e.g., by calculating the position difference or angle difference in $C_X$-$C_Y$ plane, or calculating the inner product as mentioned above. In another aspect, the processor 22 clears or cancels the cluster among the M multiple clusters having a smallest value in the second parameter "N".

Step S76-S78: The processor 22 determines whether the whole image frame IFr is processed. If the image frame IFr has not been scanned to the end, the process moves to the Step S60 in FIG. 9. After all color segments in the image frame IFr are merged into respective clusters, the processor 22 respectively averages the second parameters of each of the multiple clusters ID1 to IDN, and recognizes a color of each cluster among the multiple clusters ID1 to IDN according to a position of the averaged second parameters of each cluster in the $C_X$-$C_Y$ plane color plane, e.g., shown in FIG. 11. In this way, the processor 22 recognizes a color of a group of categorized pixels at the same time from $IF_{ID}$ to IFc as shown in FIG. 6.

Figure 1:
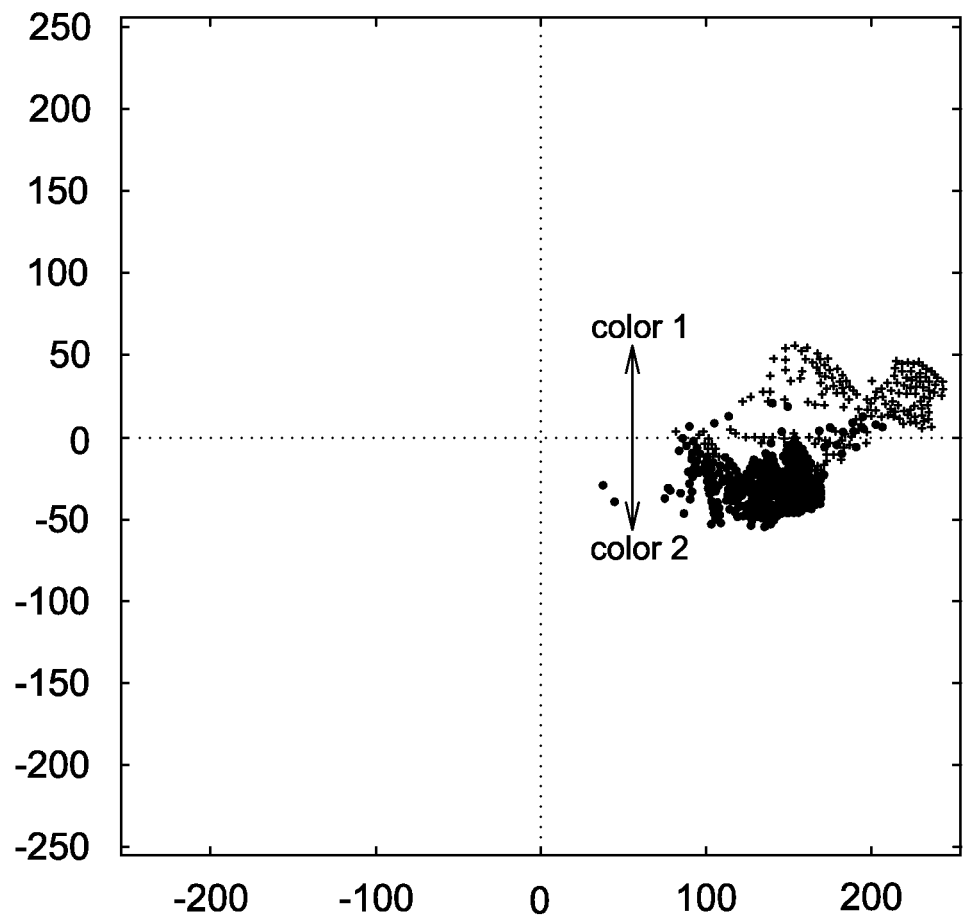
FIG. 1 is a schematic diagram of pixel colors in a color plane categorized by the conventional bar color recognition method.

As mentioned above, if there are two colors not so distinguishable, e.g., red and pink, being arranged in one color barcode, it is difficult to accurately categorize all color bars in the color barcode by recognizing each pixel using fixed color ranges in a color plane as shown in FIG. 1. Accordingly, the present disclosure further provides an optical barcode detection device (e.g., FIG. 2) and a color categorization method (e.g., FIGS. 8-9) that sequentially process every row of an image frame to find multiple color segments in each row of the image frame, categorize color segments of a same color in one cluster according to a position relationship and a color similarity between the color segments, and average cluster parameters of pixels in each cluster to accordingly recognize a color of each cluster.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A barcode detection device, comprising:
    an image sensor, configured to capture an image frame of a barcode having separately arranged color bars;
    a processor, coupled to the image sensor, and configured to
        find color segments corresponding to the color bars in each row of the image frame,
        categorize each of the color segments into one of multiple clusters according to a position relationship and a color similarity between the color segments and the multiple clusters, and
        recognize a color of each cluster among the multiple clusters according to second parameters of the each cluster after all color segments in the image frame are categorized;
    a first register, configured to temporarily store first parameters of one color segment; and
    a frame buffer, configured to store a cluster ID associated with one of the multiple clusters into which the one color segment is categorized.

2. The barcode detection device as claimed in claim 1, wherein the processor is configured to respectively compare a saturation of successive pixels in a same row of the image frame with a saturation threshold to determine a color segment in the same row of the image frame.

3. The barcode detection device as claimed in claim 1, further comprising:
    multiple second registers respectively configured to store the second parameters of each of the multiple clusters, wherein the second parameters of one cluster are updated according to the first parameters of the one color segment categorized into the one cluster.

4. The pixel circuit as claimed in claim 3, wherein the color similarity is determined according to a color difference between a summation of the first parameters of the one color segment and a summation of the second parameters of each of the multiple clusters.

5. The barcode detection device as claimed in claim 3, wherein the first parameters comprise:
    a summation of X-positions of multiple pixels in the one color segment in a color plane;
    a summation of Y-positions of the multiple pixels in the one color segment in the color plane;
    a summation of a maximum value among a red color gray level, a green color gray level and a blue color gray level of each of the multiple pixels in the one color segment;
    a start pixel of the one color segment; and
    a stop pixel of the one color segment.

6. The barcode detection device as claimed in claim 3, wherein the processor is further configured to reduce a number of the multiple clusters when the number of the multiple clusters reach a number of the multiple second registers before the all color segments in the image frame are categorized.

7. The barcode detection device as claimed in claim 1, wherein the position relationship is determined according to a current start pixel and a current stop pixel of a color segment in a current row of the image frame as well as a previous start pixel and a previous stop pixel of a color segment in a previous row of the image frame.

8. The barcode detection device as claimed in claim 7, wherein the processor is further configured to
    merge two clusters when the position relationship of one color segment is position related with the two clusters.

9. The barcode detection device as claimed in claim 1, wherein the processor is further configured to
    compare a segment length of each of the color segments with a threshold to determine whether to create a new cluster before the all color segments in the image frame are categorized.

10. A color recognition method of a barcode detection device, the barcode detection device comprising a first register and multiple second registers, the color recognition method comprising:
    storing first parameters of one color segment of an image frame into the first register;
    comparing a position relationship between the first parameters in the first register with second parameters of each of multiple clusters, respectively stored in the multiple second registers;
    merging the first parameters in the first register into the second register which stores one of the multiple clusters whose second parameters are position related with the first parameters in the first register;
    recognizing a color of each cluster among the multiple clusters according to the second parameters of the each cluster after all color segments in the image frame are merged into respective clusters;
    when a segment length of the one color segment is larger than a threshold, creating a new cluster to be stored in one of the multiple second registers when all the multiple second registers are empty; and
    when the segment length of the one color segment is smaller than the threshold, abandoning the one color segment.

11. The color recognition method as claimed in claim 10, further comprising:
    storing a cluster ID associated with the one color segment in a frame buffer when the first parameters in the first register is merged into the second register corresponding to the cluster ID.

12. The color recognition method as claimed in claim 10, further comprising:

reducing a number of the multiple clusters when the number of the multiple clusters reaches a number of the multiple second registers before the all color segments in the image frame are merged into respective clusters.

13. The color recognition method in claim 10, further comprising:
merging two clusters when the position relationship of the first parameters of the one color segment is related with the two clusters.

14. The color recognition method as claimed in claim 10, further comprising:
comparing a saturation of successive pixels in a same row of the image frame with a saturation threshold to determine the one color segment in the same row of the image frame.

15. The color recognition method as claimed in claim 10, wherein the first parameters comprise:
a summation of X-positions of multiple pixels in the one color segment in a color plane;
a summation of Y-positions of the multiple pixels in the one color segment in the color plane;
a summation of a maximum value among a red color gray level, a green color gray level and a blue color gray level of each of the multiple pixels in the one color segment;
a start pixel of the one color segment; and
a stop pixel of the one color segment.

16. A barcode detection device, comprising:
an image sensor, configured to capture an image frame of a barcode having separately arranged color bars; and
a processor, coupled to the image sensor, and configured to
find multiple color segments corresponding to the color bars in the image frame,
categorize the multiple color segments respectively into multiple clusters according to a position relationship and a color similarity between the color segments, and
recognize a color of each cluster according to second parameters of each of the multiple clusters;
a first register, configured to temporarily store first parameters of the multiple color segments; and
a frame buffer, configured to record cluster IDs of the color segments.

17. The barcode detection device as claimed in claim 16, further comprising:
multiple second registers respectively configured to store the second parameters of the multiple clusters.

18. A color recognition method of a barcode detection device, the barcode detection device comprising a first register and multiple second registers, the color recognition method comprising:
storing first parameters of one color segment of an image frame into the first register;
comparing a position relationship between the first parameters in the first register with second parameters of each of multiple clusters, respectively stored in the multiple second registers;
merging the first parameters in the first register into the second register which stores one of the multiple clusters whose second parameters are position related with the first parameters in the first register;
recognizing a color of each cluster among the multiple clusters according to the second parameters of the each cluster after all color segments in the image frame are merged into respective clusters; and
merging two clusters when the position relationship of the first parameters of the one color segment is related with the two clusters.

* * * * *